Figure 1:
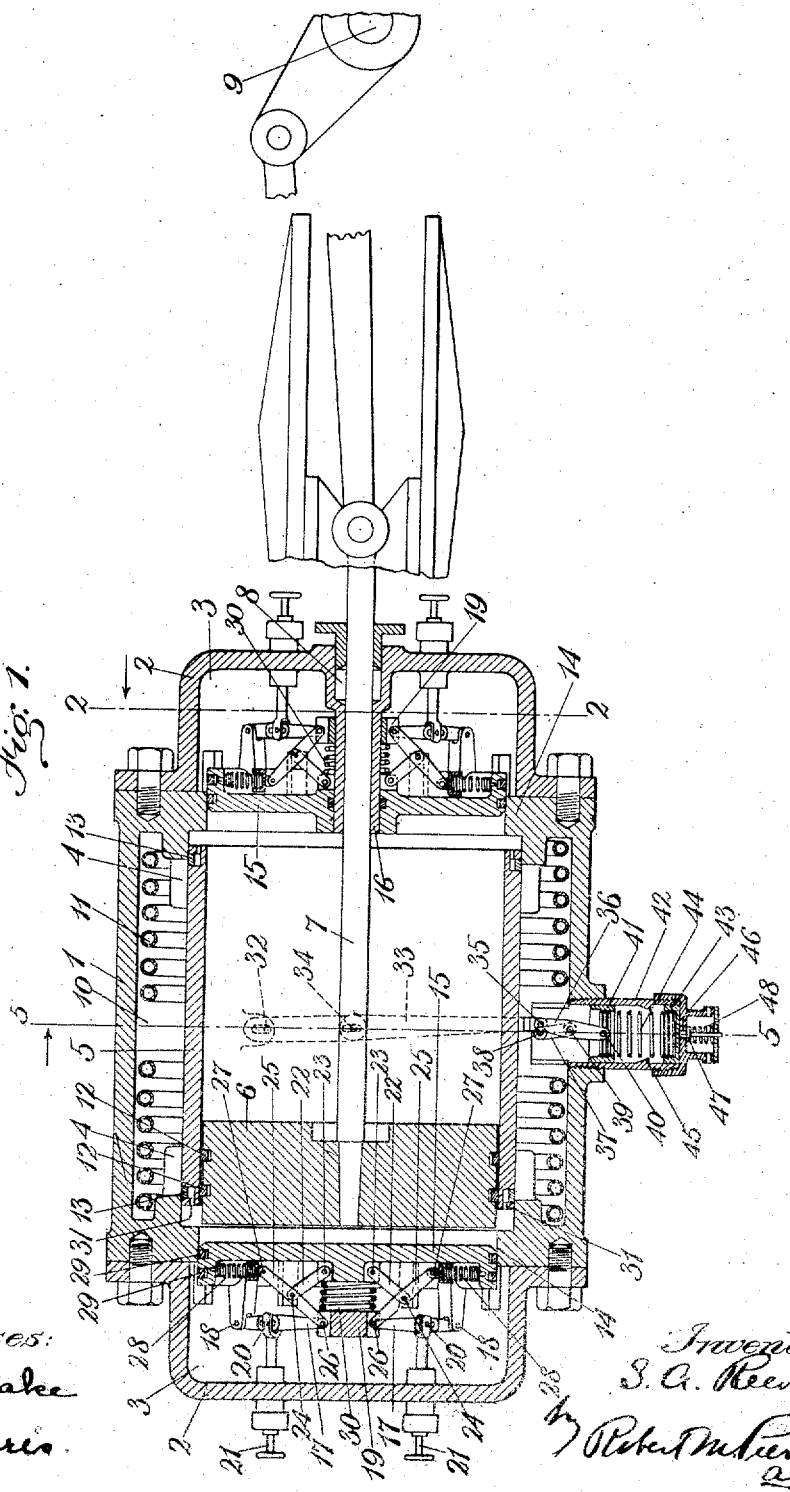

S. A. REEVE.

VALVE MECHANISM FOR ENGINES AND COMPRESSORS.

APPLICATION FILED FEB. 24, 1909.

Reissued July 13, 1909.

12,991

10 SHEETS—SHEET 1

Witnesses:

G. Blake

F. E. Naris

Inventor:

S. A. Reeve by Robert McPherson

Atty.

S. A. REEVE.

VALVE MECHANISM FOR ENGINES AND COMPRESSORS.

APPLICATION FILED FEB. 24, 1909.

Reissued July 13, 1909.

12,991.

10 SHEETS—SHEET 2.

Witnesses:

J. Blake

F. E. Naris

Inventor:

S. A. Reeve by Robert M. Pierson

Atty.

S. A. REEVE.

VALVE MECHANISM FOR ENGINES AND COMPRESSORS.

APPLICATION FILED FEB. 24, 1909.

Reissued July 13, 1909.

12,991.

10 SHEETS—SHEET 3.

Witnesses:

F. Blake

F. E. Nares

Inventor:

S. A. Reeve by Robert McKerrow att.

S. A. REEVE.

VALVE MECHANISM FOR ENGINES AND COMPRESSORS.

APPLICATION FILED FEB. 24, 1909.

Reissued July 13, 1909.

12,991

10 SHEETS—SHEET 4.

Witnesses:

G. Blake

F. E. Stares

Inventor:

S. A. Reeve by Robert McPherson

Atty.

S. A. REEVE.

VALVE MECHANISM FOR ENGINES AND COMPRESSORS.

APPLICATION FILED FEB. 24, 1909.

Reissued July 13, 1909.

12,991.

10 SHEETS—SHEET 5.

Witnesses:
G. Blake
J. E. Nares.

Inventor:
S. A. Reeve
by Robert McPherson
Atty.

S. A. REEVE.

VALVE MECHANISM FOR ENGINES AND COMPRESSORS.

APPLICATION FILED FEB. 24, 1909.

Reissued July 13, 1909. 12,991.

10 SHEETS—SHEET 6.

Witnesses:
G. Blake
F. E. Nares

Inventor:
S. A. Reeve
Robert McPherson
Atty.

S. A. REEVE.

VALVE MECHANISM FOR ENGINES AND COMPRESSORS.

APPLICATION FILED FEB. 24, 1909.

Reissued July 13, 1909.

12,991.

10 SHEETS—SHEET 7.

Witnesses:

G. Blake

F. E. Nares.

Inventor:

S. A. Reeve by Robert M. Pierson.

Atty.

S. A. REEVE.
VALVE MECHANISM FOR ENGINES AND COMPRESSORS.
APPLICATION FILED FEB. 24, 1909.
Reissued July 13, 1909.
12,991.
10 SHEETS—SHEET 8.
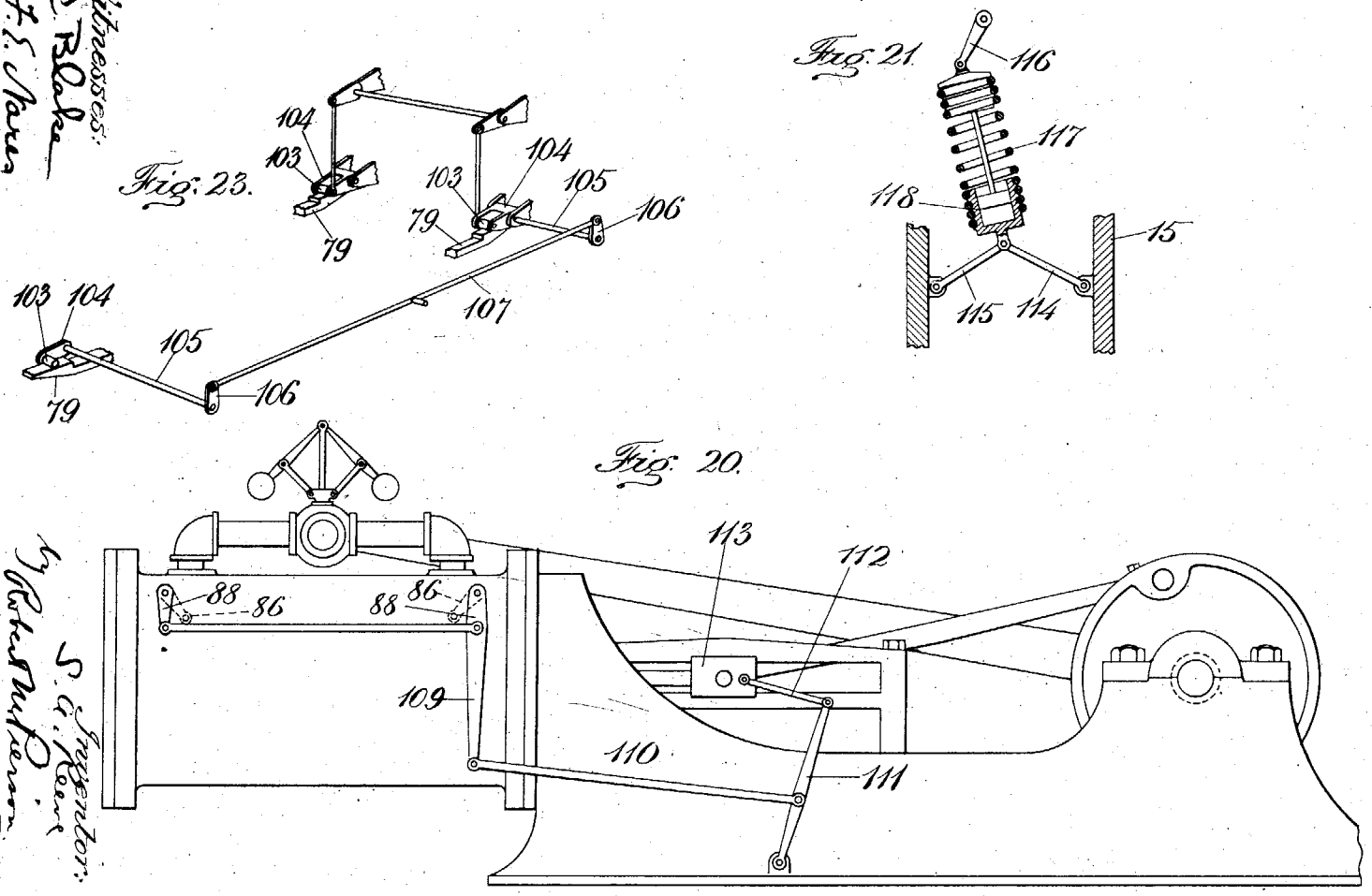
Witnesses:
C. Blake
F. E. Nares
Inventor:
S. A. Reeve
by Robert McPherson
atty S. A. REEVE.
VALVE MECHANISM FOR ENGINES AND COMPRESSORS.
APPLICATION FILED FEB. 24, 1909.
Reissued July 13, 1909.
12,991.
10 SHEETS—SHEET 9.
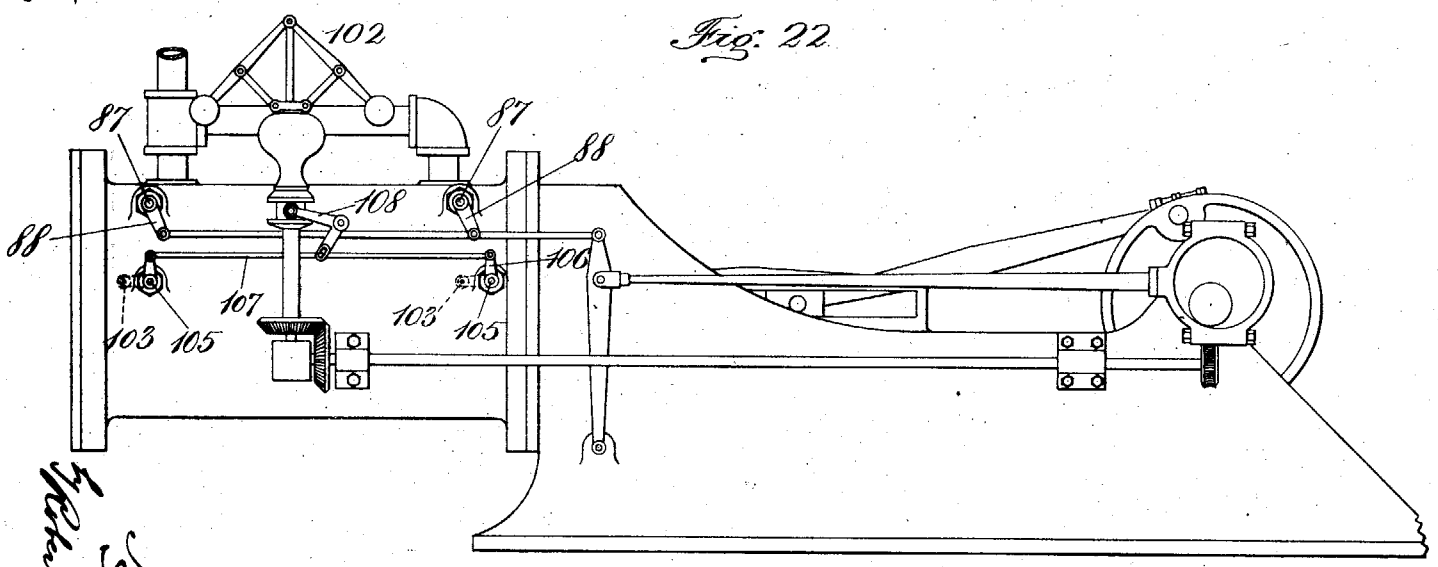
Witnesses:
G. Blake
F. E. Nares
Inventor:
S. A. Reeve
by Robert McPherson
atty.

S. A. REEVE.

VALVE MECHANISM FOR ENGINES AND COMPRESSORS.

APPLICATION FILED FEB. 24, 1909.

Reissued July 13, 1909.

12,991.

10 SHEETS—SHEET 10.

Witnesses:
G. Blake
F. E. Stares.

Inventor:
S. A. Reeve
by Robert Wilkinson
Atty.

UNITED STATES PATENT OFFICE.

SIDNEY A. REEVE, OF NEW HAVEN, CONNECTICUT, ASSIGNOR, BY MESNE ASSIGNMENTS, TO C. P. POWER COMPANY, OF NEWARK, NEW JERSEY, A CORPORATION OF NEW JERSEY.

VALVE MECHANISM FOR ENGINES AND COMPRESSORS.

No. 12,991. Specification of Reissued Letters Patent. Reissued July 13, 1909.

Original No. 880,824, dated March 3, 1908, Serial No. 75,819. Application for reissue filed February 24, 1909. Serial No. 480,239.

*To all whom it may concern:*

Be it known that I, SIDNEY A. REEVE, of New Haven, in the county of New Haven and State of Connecticut, have invented certain new and useful Improvements in Valve Mechanisms for Engines and Compressors, of which the following is a specification.

This invention relates to the construction and control of valves having a back-and-forth or reciprocating motion and especially to such valves as are actuated wholly or partly by fluid pressure, although the invention is not entirely confined to that type.

It has heretofore been a difficult matter to properly control the inertia of an automatic or semi-automatic reciprocating valve and cause it to act in proper time-relation or synchronism with the action of the fluid itself or of other moving parts, such as the piston of a compressor whose inlet or outlet the valve controls, and the difficulty is multiplied when the valve is made of relatively large area and wide port-opening in comparison with the length of its stroke.

My present invention overcomes many of the objections to automatic or semi-automatic valves by the employment of a valve-controlling device which involves the retardation and final arrest of the valve in a positive and invariable manner independent of the nature of the materials of the retarding device, such as their resilience, compressibility, or other physical quality. This device preferably takes the form of a link or links swung by the motion of the valve into positions of greatest and least mechanical advantage, and the useful effect may be enhanced by a novel combination of such a link or links with spring mechanism which acts through the linkage to arrest the valve at the extremity of its stroke and store power for starting the valve on its return stroke. With this controlling device I am enabled to employ relatively large and heavy valves of short stroke and wide port-opening in comparison to the total volume of fluid handled per cycle or period of the apparatus to which the valve is applied, as for example an elastic-fluid piston compressor.

The invention applies to compressors, pumps, steam-engines and other motors, liquid conduits etc., and it further includes certain combinations of valves coaxial with the piston, and other features of improvement, as will more fully hereinafter appear.

Figure 2:
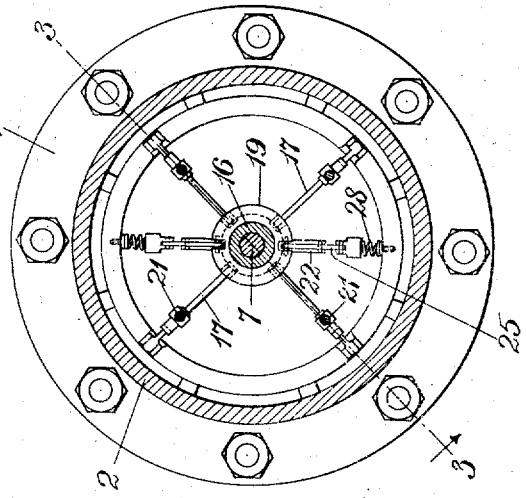
Figure 3:
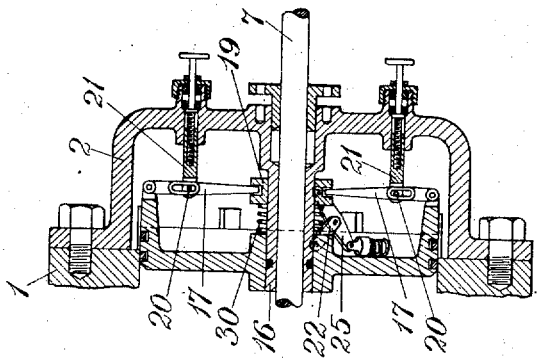
Figure 4:
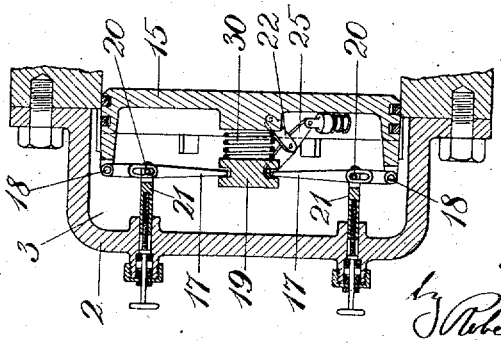
Figure 6:
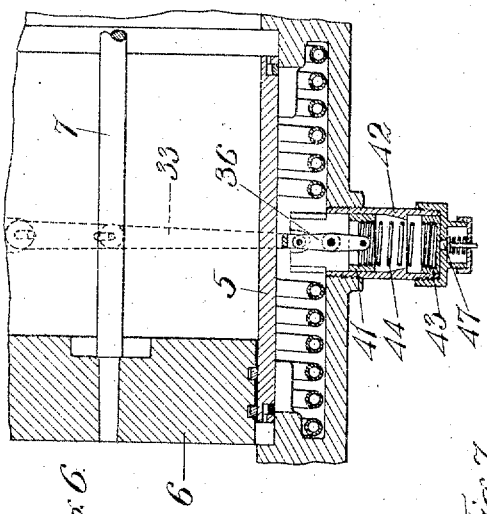
Figure 7:
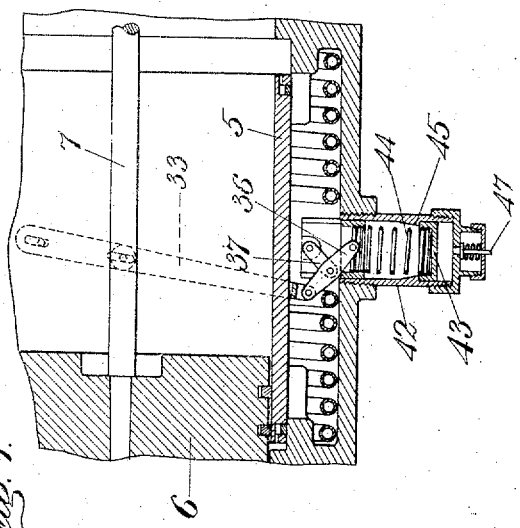
Figure 5:
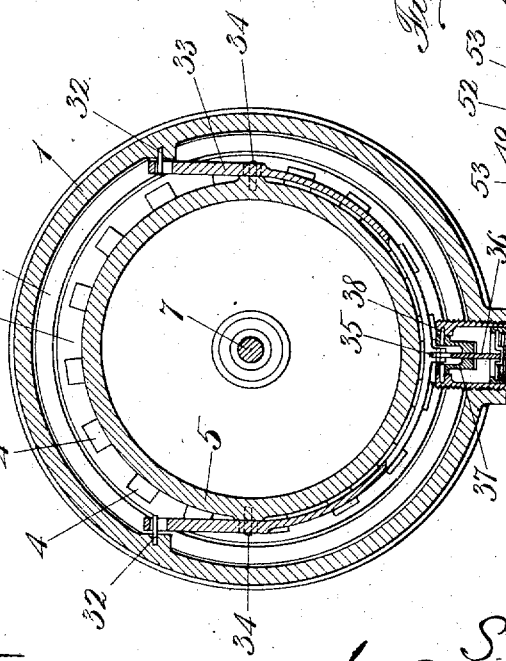
Figure 8:
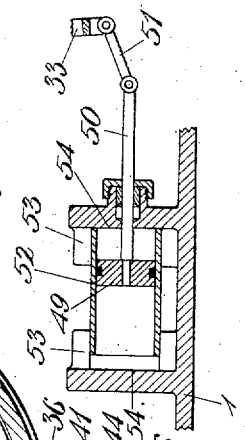
Figure 9:
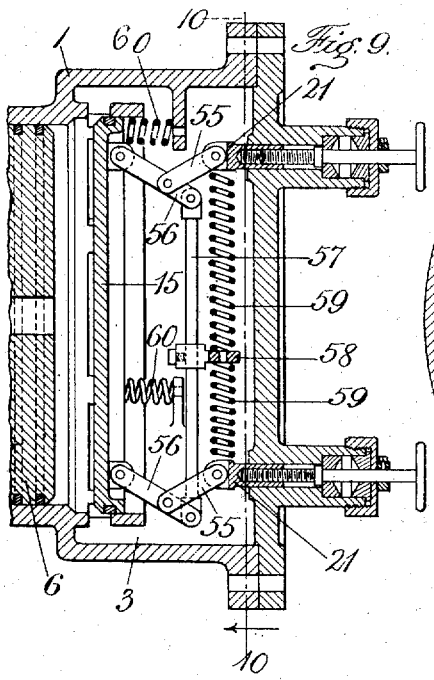
Figure 10:
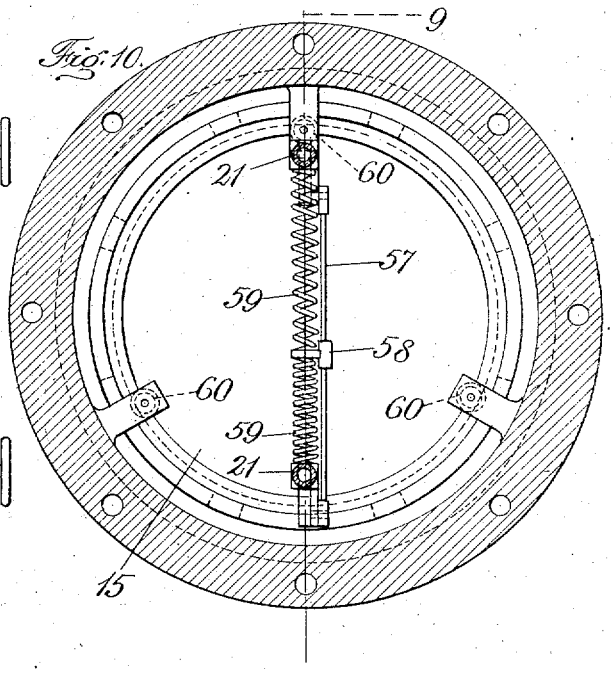
Figure 11:
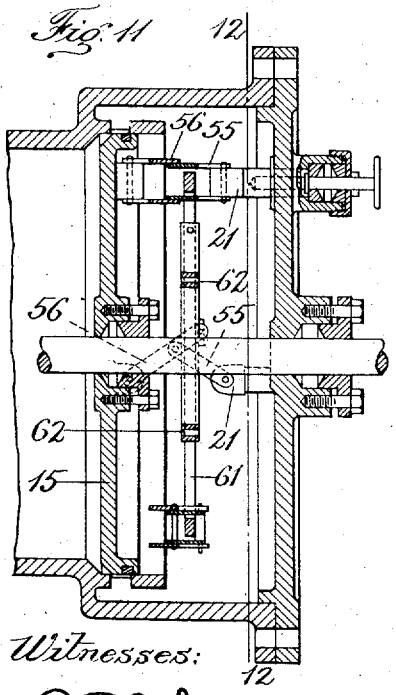
Figure 12:
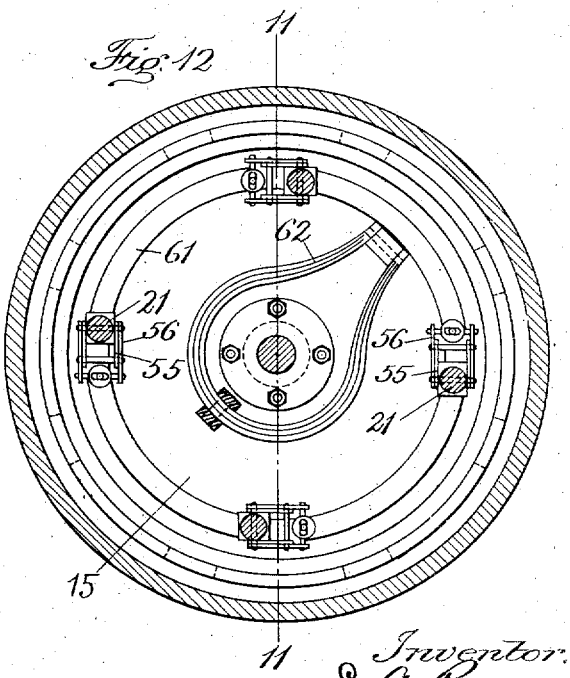
Figures 13, 24, 25:
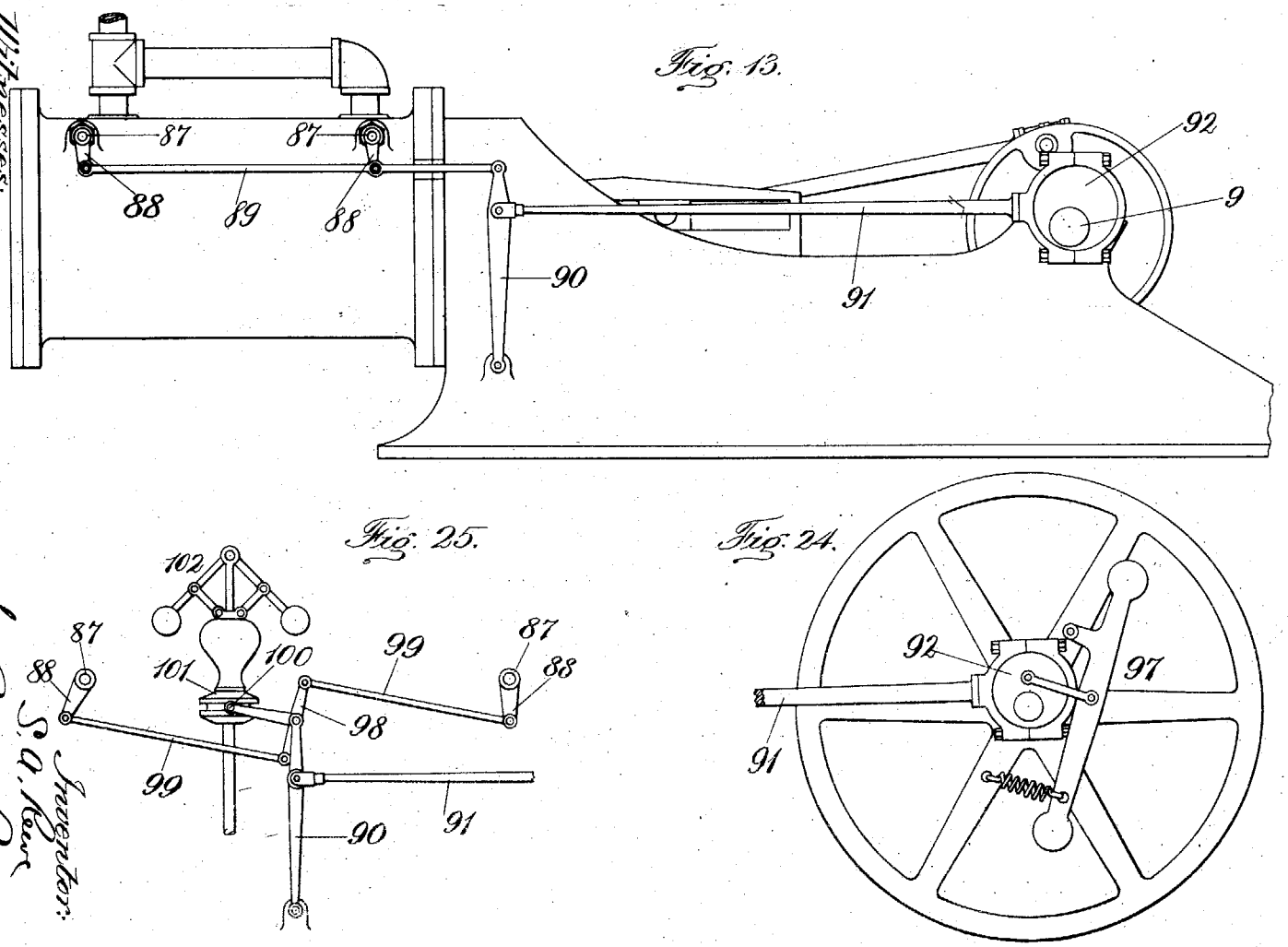
Figure 14:
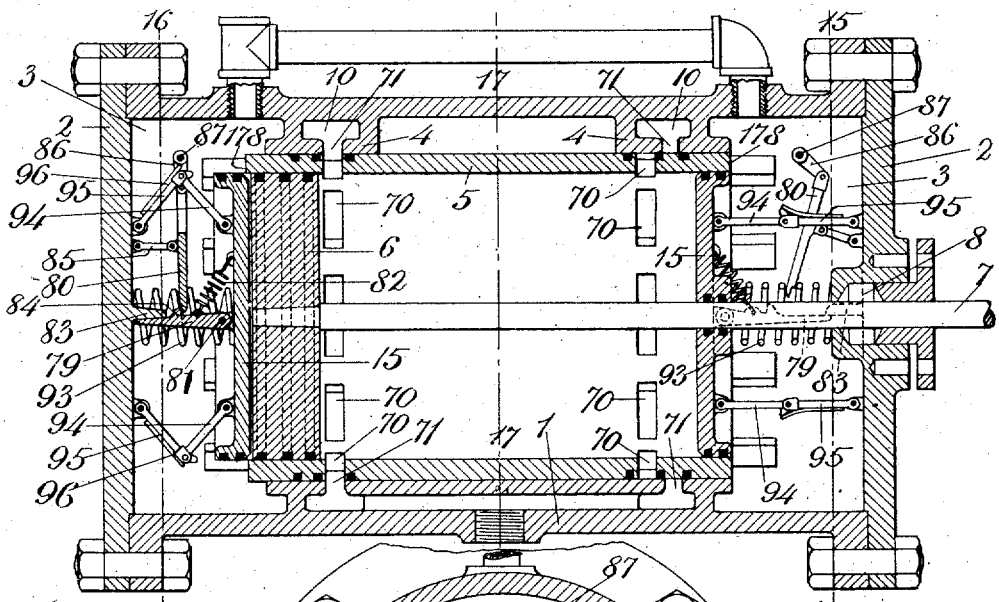
Figure 15:
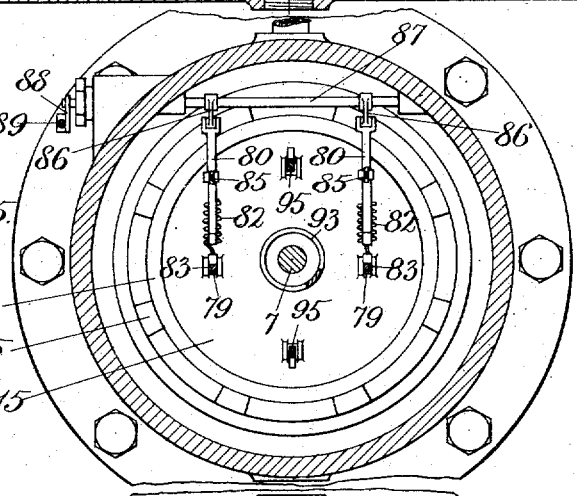
Figure 16:
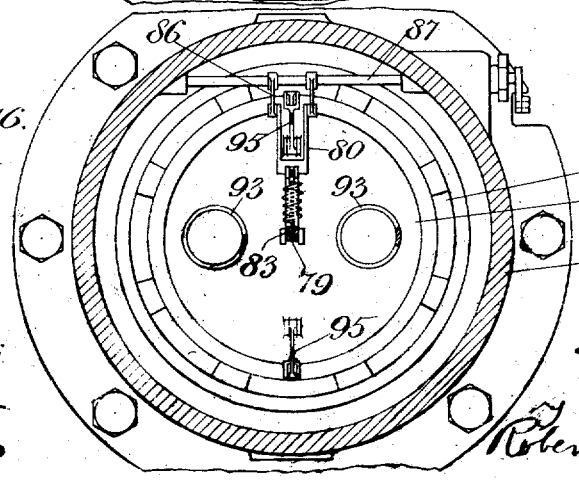
Figure 18:
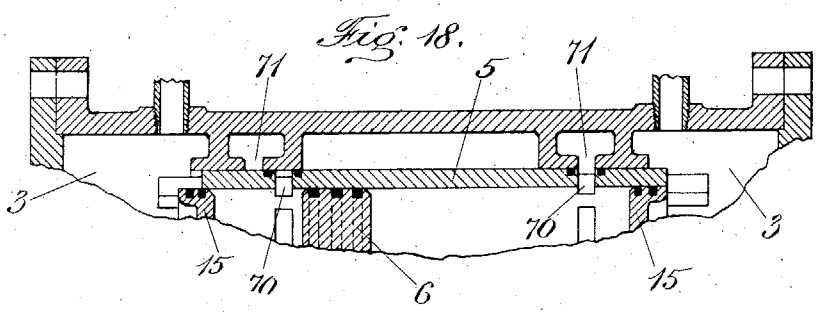
Figure 17:
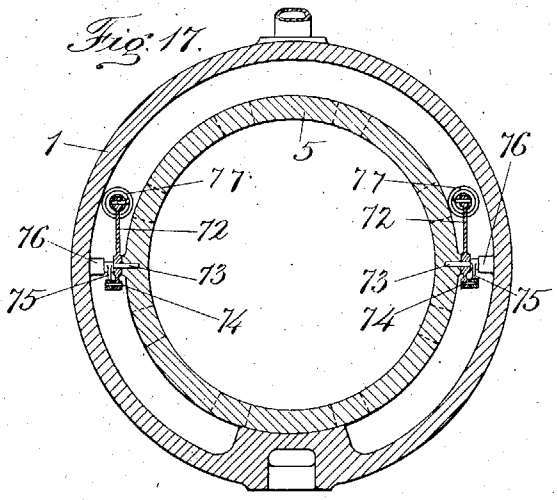
Figure 19:
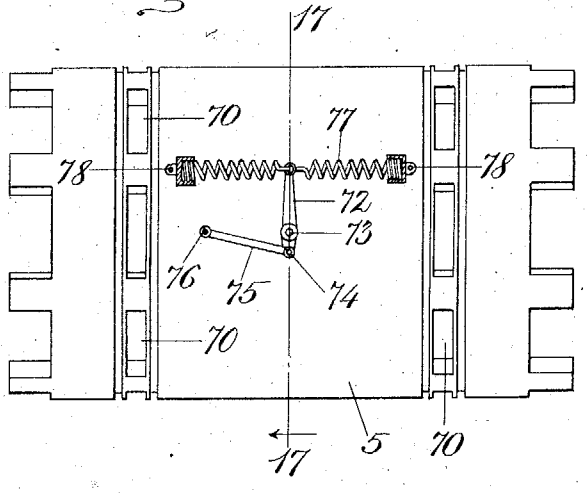
Figure 26:
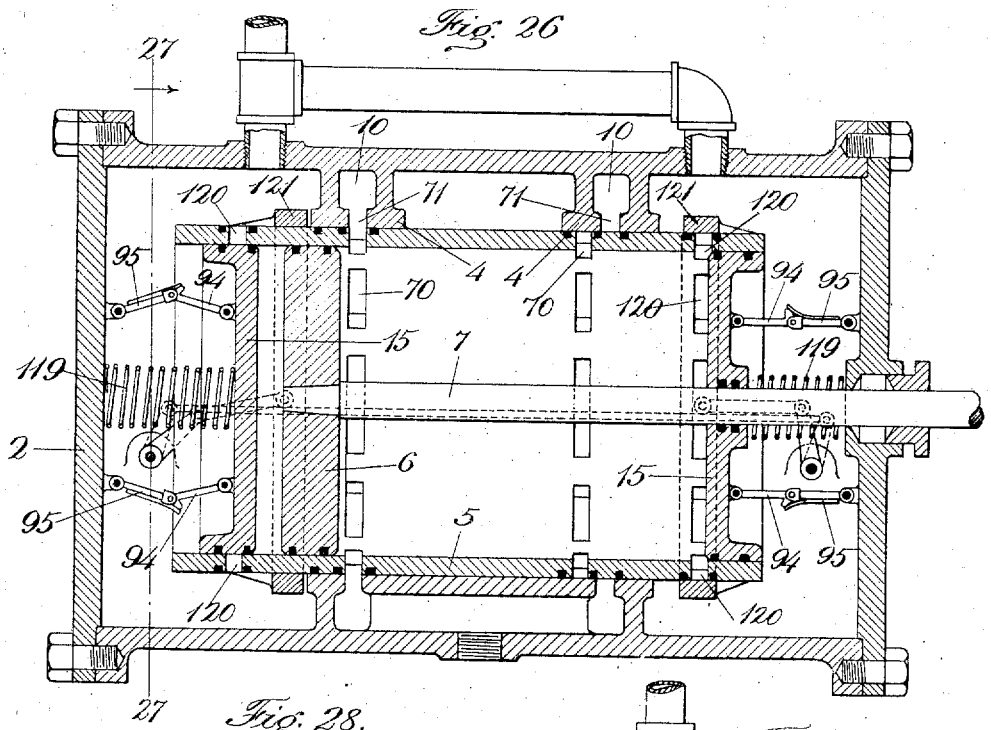
Figure 28:
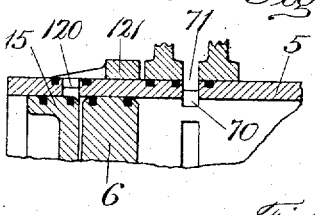
Figure 29:
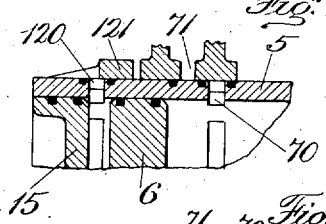
Figure 30:
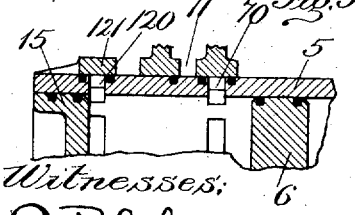
Figure 27:
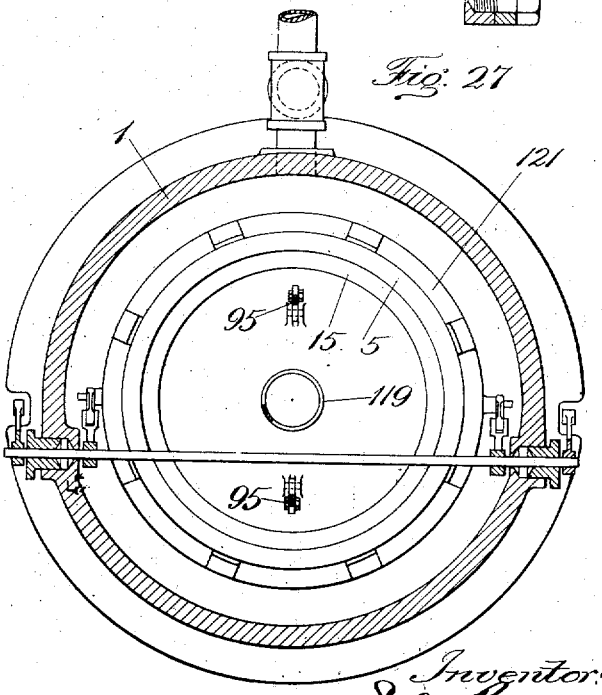

Of the accompanying drawings, forming a part of this specification,—Figure 1 represents a longitudinal section of a compressor constructed in accordance with my invention. Fig. 2 represents a section on line 2—2 of Fig. 1. Fig. 3 represents a section on the line 3—3 of Fig. 2 at the crank end of the cylinder. Fig. 4 represents a corresponding section taken at the head end. Fig. 5 represents a section on line 5—5 of Fig. 1. Figs. 6 and 7 represent detail sections corresponding to Fig. 1, showing different positions of the devices for controlling the barrel valve. Fig. 8 represents a detail section, showing a modified form of these devices. Fig. 9 represents an axial section of the head end of a compressor, showing a modified mechanism for controlling the discharge valve. Fig. 10 represents a section on line 10—10 of Fig. 9. Figs. 11 and 12 represent views similar to Figs. 9 and 10, showing another modification. Fig. 13 represents a side elevation of a steam engine provided with my valve mechanism. Fig. 14 represents an axial section through the cylinder. Figs. 15, 16, and 17 represent sections on the correspondingly numbered lines of Fig. 14. Fig. 18 represents a detail sectional view corresponding to Fig. 14, showing a different position of the parts. Fig. 19 represents a side elevation of the exhaust valve and its controlling mechanism. Fig. 20 represents a side elevation, showing a modified form of mechanism for operating the trip devices for the admission valves. Fig. 21 represents a detail axial section, showing a modified device for operating the admission valves. Fig. 22 represents a side elevation, showing means for governing the trip mechanism. Fig. 23 represents a perspective view of part of said governing mechanism. Fig. 24 represents a side elevation, showing a different means for governing the trip mechanism. Fig. 25 represents a side elevation, showing still another means for performing such governing. Fig. 26 represents an axial section of an engine having modified cut-off arrangements. Fig. 27 represents a section on line 27—27 of Fig. 26. Figs. 28, 29 and 30 represent detail sectional views, showing different positions of the parts illustrated in Fig. 26.

The same reference characters indicate the same parts in all of the figures.

Referring at first to Figs. 1 to 12 inclusive, which represent my invention as adapted to a compressor which I shall refer to in this description as an air-compressor, for the purpose of illustration only, 1 represents a fixed outer casing having removable heads 2, 2 containing discharge chambers 3, 3 which in both this and the motor forms of my invention I term generically "pressure chambers" or head chambers. The said casing 1 has guides 4, 4 for a cylindrical barrel 5 in which the piston 6 operates, said piston being connected to a piston-rod 7 passing through a stuffing-box 8 in one of the heads 2 and reciprocated from a crank-shaft 9. Outside of the barrel 5 is a suction chamber 10 containing a cooling coil 11. The barrel 5 acts as the admission valve and is moved a limited distance in its guides at the beginning of each stroke of the piston 6 by the friction of the piston-rings 12, 12 against the barrel, so as to alternately open the opposite ends of the cylinder space inclosed by the barrel to the suction chamber 10. This barrel is non-seating, that is it does not bring up against a stop or seat at the end of its stroke. The pressure of the piston-rings 12 is regulated so that their friction predominates over the friction of the barrel-rings 13, 13.

14, 14 are guides or short cylinders forming fixed extensions of the walls of the main cylinder, in which are mounted discharge valves 15, 15 having the form of short disk-like pistons. The discharge valve 15 at the head end of the cylinder forms the whole of the end wall of said cylinder. The valve 15 at the crank end, in addition to being guided by the cylinder walls, is also shown as guided on a tubular extension 16 of the head 2, the said valve being annular in form. For the purpose of preserving the parallel movement of the discharge-valves each valve 15 is hung on a series of radial levers 17, 17 pivoted at 18, 18 to the valve and engaged at their inner ends with a central block 19, said levers being fulcrumed at 20 on the inner ends of adjustable stems or supports 21 which may be moved in or out to vary the normal position of rest of the valve 15.

22, 22 are links pivoted at 23, 23 to the back side of the valve 15 and at 24, 24 to floating levers 25, 25 whose near ends are pivoted at 26, 26 to the block 19, while their remote ends are pivoted at 27, 27 to the inner ends of radial springs 28, 28, the outer ends of the latter being attached to the valve 15. Each pair of links 22, 25 constitutes a toggle adapted to straighten either in radial or axial direction and each link has a crank-like swinging motion toward a dead-point reached where the toggle straightens, and is guided by the other link. Each link, together with its pivot and a suitable guide for its swinging end, is comprised within the term "linkage" and the preferred form of such linkage is that in which two links are combined into a toggle substantially as described. The springs 28 are adapted to take either compression or tension and in their natural length will hold the valve 15 in an intermediate position with its first packing-ring 29 just inside of the edge of the cylinder, substantially as shown in Fig. 1, so as to just cut off the cylinder space from the discharge chamber 3. Between the block 19 and the back of the valve 15 is interposed a spring 30 to cushion the outward throw of the valve. As the piston 6 moving on its compressing stroke toward either discharge valve 15 creates within the cylinder a pressure slightly above that in the discharge chamber 3, the springs 28 are compressed and the valve opens. The great area of the valve and the mechanical advantage which it possesses over the springs when the toggles are straightening toward radial position would enable a very slight excess of pressure in the cylinder to open the valve, but in actual operation, when the pressure in the cylinder simply equals the discharge pressure, the valve will already be in motion outwardly and its inertia will serve to carry it over the cut-off position with little or no help from excess pressure. As the piston slows down toward the end of its stroke, as the flow of air becomes less vigorous, and as the inertia of the valve is overcome, the springs 28, 28 aided by the spring 30, stop the valve and immediately start it back toward cut-off position. This drives out of the cylinder the air remaining between the piston and valve and reduces the effective clearance of the machine to practically zero. As the piston and valve start back together on the new piston-stroke, the springs 28, 28 will help the valve until the point of cut-off is reached, after which they will tend to retard it. But the instant cut-off is effected, the motion of the piston, aided by any tendency on the part of the valve to slow down, immediately reduces the pressure of the insignificant amount of clearance-air entrapped between the two. There will then act upon the back of the valve a force tending to draw it after the piston which is many times greater than any of the forces which have been acting on it during the period of discharge and which at first completely overpowers the springs 28, 28. The valve then follows the piston at the maximum velocity which said valve can attain, insuring a prompt, quick cut-off, and is brought to rest quietly and without shock by the action of the links 22, 25. During the remainder of the suction stroke and some portion of the compression stroke the valve hangs in its innermost position, the springs 28 being unable to overcome the great pressure in the discharge chamber, but as the compression increases in the cylinder and tends to equalize with the discharge pressure, the springs 28, owing to the great mechanical advantage which they possess over the toggles in the axial position of the latter, are able to start the valve toward opening even though they be relatively light springs. This approach toward opening is made with constantly accelerating velocity as the compression more nearly approaches discharge pressure, and the prompt opening of the valve by its own inertia is thus insured when the pressures become equal.

The springs, links and levers may be made lighter relatively to the other parts than they are shown in the drawings, the disproportionate illustration being adopted for the sake of clearness and compactness of representation. In this and subsequent forms of my invention it will be seen that the positions of the piston 6 and valves 15 overlap, that is to say, during alternate periods they or portions of them traverse the same space. As the toggles straighten into their axial position with the inward or closing movement of the discharge-valve 15, they assume a condition of maximum mechanical advantage over the valve and would therefore be able to arrest the valve by a positive retardation without shock, even if the springs 28 were not present. The mechanical advantage of the toggles becomes infinite when they are fully straightened. The springs, however, acting through the toggles, modify and improve this mechanical or positive cushioning action, and it should be noted that their mechanical advantage over the toggles is greatest at the moment when that of the valve over the toggles is least, that is, when the toggles are straightened axially, or stated otherwise, the mechanical advantage of the toggles over the valve and of the springs over the toggles culminate at the same time. Theoretically the springs would be able to prevent absolute straightening of the toggles, no matter how great the inward pressure on the valve, because at such time the mechanical advantage of the springs is infinite. The power which is stored up in the springs by the movement of the valve to its inner extreme acts with great potency to start the valve on its return movement as soon as the inwardly-acting forces are overcome. The toggles for the discharge-valves as here shown do not act in the same way, that is with the maximum mechanical advantage over the valves, in arresting the valves at their outward or port-opening limits, as the opening forces are of smaller magnitude than the closing forces and can be otherwise handled as already described, but they might be made to so act and in the case of the barrel admission-valve 5, now to be described, I have shown a toggle acting with maximum mechanical advantage over the valve and with minimum mechanical advantage over its spring, at both extremes of the valve's movement.

Referring to Fig. 1, the admission-valve 5 opens the suction chamber 10 to the cylinder-space to the left of the piston just after the beginning of the right-handward stroke of said piston. To provide for its retention in closed position prior to that until the clearance-air has fallen in pressure substantially to the pressure of the suction chamber, I locate the expansible packing-rings 13, 13 on the outside of the suction-valve at each end thereof and bring the pressure of the clearance space to the inner side of said rings through small ducts 31, 31 in the valve. At the beginning of the piston-stroke (Fig. 1) the left-hand ring 13, being pressed outwardly by the clearance pressure against the valve guide 4, causes the valve to stick in its extreme closed position until the excess clearance pressure is relieved by the piston 6 moving away from the discharge valve 15, after which the suction-valve is free to open. These rings therefore constitute a means controlled by the pressure within the barrel for retarding the initial movement of the barrel.

Fulcrumed at 32 to the sides of the outer casing 1 is a forked lever 33 which is pivoted at 34 to the barrel-valve 5 and has its free end pivoted at 35 to one end of a link or floating lever 36. The latter is guided by a second link 37 pivoted at 38 to a fixed support and at 39 to the middle of the link 36. The links 36, 37 form a toggle whose links are movable through angles of substantially 180° so as to straighten said toggle in either direction substantially parallel to the cylinder axis, which two positions it assumes in the extreme positions of the barrel valve 5. The lower end of the link 36 moves in a line at right angles to the cylinder axis and is pivoted at 40 to a small cross-head 41 operating in the bore of a cylinder 42. The lower end of said cylinder has a piston 43 moving with considerable leakage in the cylinder and connected by a spring 44 with the cross-head 41. Said spring takes either compression or tension and when the piston 43 resides against a shoulder 45 which limits its upward movement, and the toggle is straightened parallel to the cylinder axis, the spring is then slightly in tension. In the head of the cylinder 42, which with the piston 43 constitutes a dash-pot, is an outlet opening 46 controlled by a valve 47 which is closed by a light spring 48.

Assuming the suction-valve 5 to be in its left-handmost position and the piston 6 at left-hand dead-center, the toggles 36, 37 will will then be positioned to the left nearly parallel to the cylinder axis. The spring 44, owing to its mechanical advantage over the valve, then exerts a tendency to bend the toggle and move the valve toward the right, which tendency, however, will be ineffective until the piston has moved far enough on its stroke to the right to reduce the clearance-pressure and relieve the friction exerted by the expansible ring 13 on the guides 4. The spring 44 will then start the valve in motion toward the right, aided by the friction of the piston 6 on the valve, which is sufficient to keep the valve moving and open it promptly. There is no obstruction to the movement of the valve while the links 36, 37 are passing their middle position, shown in Fig. 6, for the downward movement of the cross-head 41 transmitted through the spring 44 to the piston 43 occurs freely, owing to the opening of the valve 48 and the free movement of said piston into the end of its cylinder. As soon, however, as the links pass their middle position, the piston 43 attempts to move out against a vacuum resistance caused by the closing of the valve 48, and the spring 44 is put under tension. The mechanical advantage remains with the barrel-valve until the latter nears the end of its stroke, when that of the spring predominates and the latter exerts a tendency to slow down the valve and bring it to a stop. The positive retardation of the valve near the end of its travel, due to the motion of the links 36, 37, would bring the valve to a stop quietly and without shock even if the springs were not present, in a manner quite similar to the arrest of the discharge valves 15 by their toggles as previously explained, but the springs have the effect of adding a cushioning action. By the term "positive retardation" I intend to convey the idea of a positive mechanical cushion such as is characteristic of the linkage and toggles described, as distinguished from a resilient cushion such as that afforded by a spring, a dash-pot or the like, acting alone. While the valve 5 is at rest at the end of its stroke, the leakage past the piston 43 allows the latter to crawl out to its stop 45 and decreases the tension of the spring 44 to the amount desirable at the beginning of the return stroke of the working-piston.

Other devices for arresting the barrel-valve without shock may be adopted and in Fig. 8 I have shown a simple alternative mechanism for this purpose consisting of a piston 49 whose rod 50 is connected by a link 51 to the lower end of the lever 33, the piston 49 operating with some friction in a cylindrical sleeve or barrel 52 which has a limited movement in guides 53, 53 and is adapted to abut against either of two stop-surfaces 54, 54 which then seal its ends. The device is a modified double dash-pot which permits the suction-valve 5 to start on its stroke without resistance and interposes a yielding resistance at the ends of said stroke to cushion the valve.

It will be seen that both the admission and discharge valves are operated by the compressor piston, in the former case directly by friction and in the latter case through the medium of the fluid compressed between piston and valve.

Figs. 9 and 10 represent a modified form of mechanism for controlling the discharge-valve. In this modification two toggles are shown similar in action to the toggles illustrated in Fig. 1 and each composed of links 55, 56 pivoted to each other, and to adjustable supports 21 and the valve 15 respectively. The extensions of the links 56 are connected pivotally to a rod 57 having an adjustable collar 58 between which and the supports 21, 21 are interposed springs 59, 59. These springs in their natural length tend to hold the valve 15 at its cut-off position and when said valve is on either side of said position one of the springs is in compression and the other in tension, thus tending to return the valve to said position. 60, 60 are longitudinal springs adapted to cushion the extreme outward movements of the valve and start it on its return.

In another modification shown in Figs. 11 and 12, the toggles 55, 56 are in tangent planes and the rod 57 described in the preceding modification is resolved into a ring 61 attached to the free ends of a substantially U-shaped leaf-spring 62, the middle part of which is fixed to the head 2 of the compression chamber and has the same action as the two springs 59, 59 in Figs. 9 and 10, the ring having back-and-forth circumferential motion against the tension of spring 62, which latter normally tends to hold the valve 15 in an intermediate position. In Figs. 9 to 12 the suction-valves are not shown, but any suitable form of such valves may be provided.

Among the advantages of my improved valve-mechanism as applied to compressors are (1) simplicity and cheapness, since lathe-work may be largely relied on to produce the working parts; (2) compactness, attained by wrapping one of the valves around the cylinder; (3) very low clearance; (4) prompt and wide opening of valves with absence of resistance to flow of fluid which is characteristic of ordinary automatic valves; (5) very small travel of valves; (6) motive power for operating the valves supplied from the piston; (7) proper working at high speeds.

The construction of a pump embodying my invention is or may be substantially similar to that of a compressor.

The main structural characteristics of the valve-mechanism above described for compressors are retained in applying my invention to motors of the steam-engine type, but in such motors the movable barrel becomes the exhaust or discharge valve and the movable cylinder-head becomes the admission or steam valve. The differences in mechanism relate principally to devices for controlling the cut-off of the steam.

Referring to Figs. 13 to 19 inclusive, 1 is the fixed outer casing having removable heads 2, 2. 3, 3 are the live-steam chambers, 4, 4 are guides for the movable barrel 5 in which the piston 6 operates, 7 is the piston-rod passing through a stuffing-box 8, and 9 (Fig. 13) is the crank-shaft driven by the piston. 70, 70 are exhaust-ports in the valve 5 adapted to register with either one of two sets of fixed ports 71, 71 communicating with exhaust-chambers 10, 10 in the casing. The valve 5 may be arrested in either of its two exhaust positions by a mechanism such as that shown in Fig. 1 or that shown in Fig. 8, or it may be controlled by a mechanism such as shown in Figs. 17 and 19, which involves the toggle principle and comprises a link or lever 72 pivoted at 73 to the valve 5 and at 74 to a second link 75 which is pivoted at 76 to the wall of the outer casing 1. The upper end of link 72 is connected to the middle of a spring 77 whose ends are attached at 78, 78 to the casing. The toggle formed by the links 72, 75 can straighten into alinement parallel to the cylinder-axis either in doubled or extended form according as the valve 5 is at one extreme or the other of its movement, and in so doing it brings the valve by a positive retardation due to the crank-like action of the links, to rest quietly and without shock. The spring 77 in its natural length tends to hold the valve in its middle position and on either side of said position it possesses a mechanical advantage over the valve and tends to start the valve at the beginning of a stroke of the working piston 6.

15, 15 are the piston-valves controlling the steam-admission and forming the cylinder heads, said valves being guided in the outer ends of the movable barrel 5 and movable on either side of the cut-off lips or edges 178, 178 of said barrel. As the piston moves out on a working stroke, say to the left as viewed in Fig. 14, it carries the barrel-valve 5 to its left-handmost position and opens the left-hand set of exhaust ports, as shown, the other set of ports being simultaneously closed. Exhaust occurs from in front of the advancing piston until the piston covers the left-hand ports 70, when a quantity of cushion-steam is entrapped between the piston and the admission valve 15. As this cushion-steam rises in pressure to or above the pressure of the live steam in the inlet-chamber 3, the valve 15 retreats and opens the cylinder-space to the live-steam chamber. The valve is caught and held in open position by the engagement of a latch 79 carried by the valve with a trip-lever 80. The latch is pivoted at 81 to the back of the valve and is normally held by a spring 82 in engagement with a fixed guide 83. The latch has a lip or abutment 84 with an abrupt inner face and a beveled back adapting it to slip into engagement with the trip-lever 80 and be held thereby so as to prevent inward movement of the valve until the trip-lever is withdrawn upwardly to release the latch. The trip-lever 80 is pivoted to a guiding link 85 and at its upper end is pivoted to an oscillating arm 86 secured to a transverse rock-shaft 87 which is provided outside of the casing 1 with an arm 88. Said arm 88 and a similar arm 88 on the rock-shaft 87 at the opposite end of the cylinder are oscillated in unison by connection with a rod 89 attached to a rock-lever 90, the latter connecting with the rod 91 of an eccentric 92 on the crank shaft 9. The latches 79 and trip-levers 80 at the crank end of the cylinder are shown in duplicate and the oscillating arms 86 are placed on their shaft at a different angle from the arm 86 at the head end so as to move their trips 80 into position to release their latches when the trip at the head end is in position to engage its latch, and vice versa.

93, 93 are springs interposed between the heads 2 and the valves 15 to move the valves into cut-off position when released.

94, 95 are links forming toggles connecting the valves 15 with the heads 2 and provided with leaf-springs 96, 96 to insure that the toggles shall break or bend when the proper time arrives for the valves to move outwardly.

Fig. 14 shows the piston 6 at left-hand dead-center. As it moves out to the right on a new stroke the barrel-valve 5 is carried with it until the admission port is wide open. The right-hand end of the cylinder remains open to the exhaust, for as the left-hand set of exhaust ports moves out of register the right-hand set of ports moves into register. After the piston has proceeded on its stroke a predetermined distance, the eccentric 92 lifts the left-hand trip-lever 80 and releases the valve, and the latter, under the influence of the compressed springs 93 moves smartly to the right and overtakes the edge of barrel-valve 5, thus effecting a cut-off of steam. When the cut-off has been accomplished by the slightest degree of completeness, the further motion of valve 15 to the right is insured by the immediate drop of pressure in the cylinder and the heavy over-balance of pressure which is thereby created on the back of the valve. The cut-off is thereby immediately made secure by the surfacing of all of the packing-rings of the valves 15 upon the barrel beyond the edge 178 thereof, and the valve 15 is brought quietly to rest by the action of the links 94, 95. The piston 6 now completes its course, expanding the steam in the cylinder, until it completely overruns the right-hand exhaust-ports, when exhaust takes place thereby. Previously to that, the right-hand end of the cylinder had cushioned when the right-hand edge of the piston overran the right-hand exhaust-ports. The above-described cycle is now repeated by the right-hand end of the cylinder.

Governing may be effected in various ways. Fig. 24 shows an ordinary shaft-governor 97 for varying the angular advance of the eccentric 92 according to the speed of the engine without varying its eccentricity, thereby varying the time of cut-off relatively to the position of the piston in its stroke.

Fig. 25 shows a device for varying the positions of the arms 88 relatively to a fixed eccentric, by means of a fly-ball governor. 90 is a rock-lever driven as in Fig. 13 and having pivoted at its upper end a double bell-crank or T-lever 98, the opposite arms of which are connected by links 99, 99 with the arms 88. The stem of said lever 98 has a stud 100 operating in a guide 101 movable vertically according to the speed of the engine, by a fly-ball governor 102.

Figs. 22 and 23 represent means for governing by varying the position of the latches 79 by means of a fly-ball governor. In place of the fixed guides 83 of Fig. 1, I provide roller-guides 103, 103 for said latches, carried by arms 104, 104 which are oscillated by rock-shafts 105, 105. On said shafts outside the casing are arms 106, 106 connected together by a rod 107 engaged by a bell-crank 108 which is oscillated by a fly-ball governor 102. As the speed of the engine varies, the latches 79, 79 are raised or lowered slightly and the time of cut-off varied accordingly.

Fig. 20 shows the arms 88 which operate the trip-levers, oscillated from the engine cross-head through an extension 109 on one of said levers 88 connecting by a link 110 with a rock-lever 111 which is connected through a link 112 with the cross-head 113. An eccentric is thus dispensed with. An engine of this kind will run equally well in either direction, such construction being suited principally for small engines which can be reversed by hand.

Fig. 21 illustrates a device whereby cut-off is effected by means of a positive connection between the eccentric and the admission valve. 114, 115 are links forming a toggle which connects the valve 15 with the fixed head 2. 116 is an arm oscillated by an eccentric, preferably governed as in Fig. 24, said arm being connected with the junction of the links 114, 115 by means of a spring 117 and also through the medium of a dash-pot 118. In this arrangement the valve 15 is free to move under the influence of fluid and inertia forces as in Fig. 14 somewhat independently of the position of 116, the action of the eccentric being such as to always oscillate the arm 116 upwardly before the time of cushion in the cylinder and thus permit the valve to open. The point at which the valve stops after opening depends upon the instantaneous position of arm 116. Cut-off is effected by the downward movement of said arm which compresses the spring and the steam in the dash-pot and moves the valve 15 to the right. Actual bottoming of the dash-pot piston need not take place in normal running, but in case of faulty adjustment such bottoming will be the assurance of proper cut-off. The device will operate properly by using either the spring or dash-pot separately, although I prefer to combine the two.

In the modification shown in Figs. 26 to 30 inclusive, cut-off is effected by an independent valve. In this case the travel of the valve 15 is much shorter than in the cases previously discussed and the valve moves entirely without external control. Said valve is backed by a spring 119 and connected to the head 2 by toggle-links 94, 95. The cushioning of the steam in front of the piston forces the valve outwardly past the edge of the admission ports 120, 120 in the barrel-valve 5, but instead of remaining open it is urged by the spring 119 to return immediately. On the return stroke of the piston, the piston 7, piston-valve 15, and barrel-valve 5 at first move out together. The actual admission of steam is effected by the movement of the barrel-valve 5 to the right as the piston 6 starts to move away from valve 15 on its working stroke. Cut-off is effected by an annular valve 121 operated positively by an eccentric and moving over the ports 120. This cut-off occurs sharply, since it is effected by the valve 121 in the middle of its stroke, rather than at the end when it has slowed down. Three stages in the early part of the stroke are shown in their order of occurrence in Figs. 28, 29, and 30.

The principal advantages of my invention as applied to steam-engines are, (1) simplicity and cheapness; (2) compactness; (3) low clearances; (4) rapid opening and closing of valves; (5) small travel of valves; (6) elimination of eccentrics as transmitters of power for operating valves; (7) retention of the advantages of the piston-valve with others hitherto offered only by four-valve engines; (8) jacketing of heads: (9) no possibilty of water wreck; (10) prompt and free exhaust and constant cushion; (11) combination of exceptionally low clearances with full and unlimited cushion.

While I have described with some particularity the effects of the toggles in controlling the motions of non-seating freely-moving valves, it will be understood that the invention is not wholly limited to the use of these toggles nor to freely-moving valves. In addition to the novel structure and functions of the barrel-valve and the movable head-valve, apart from their combinations with the toggles, with each other, and with the annular cut-off valve shown in Fig. 26, I believe myself to be the first to provide the combination of a main working piston reciprocating in a cylinder, and two or more coaxial and coöperating valves, at least one of which surrounds the piston and may constitute the cylinder barrel, these valves being preferably both or all non-seating valves sliding axially on each other. I also believe myself to be the first to provide a sleeve valve telescoped with the cylinder casing and with a cylinder head or other cylindrical member internal to the sleeve valve, the sleeve valve having a movement relative to the working piston and controlling communication with the cylinder space by an external coöperation with the cylinder casing and an internal coöperation with the said cylindrical member, the latter permissibly being as shown, a slide-valve having its own independent movement.

The combinations mentioned are particularly shown in Figs. 14 and 26, but these arrangements are of course subject to various modifications, and alterations in mode of control, without sacrificing their characteristics, it being my intention to claim broadly, in connection with the main reciprocating piston 6, which of course need not be a double-acting piston, the combination of the valves 15 and 121 or either of them or their substantial equivalents, with the cylinder-valve 5 or its substantial equivalent, with each other, with the fixed casing, and with the described operating expedients or any suitable modifications thereof; as well as the various useful sub-combinations of these elements. An engine, compressor or pump thus equipped is very compact, durable, and relatively inexpensive to construct, operates quietly, retains the pressure-tightness of its cylinder for a long time, has small or favorably-shaped clearance spaces, short ports and maximum freedom of fluid entrance and exit, as well as simplicity and other advantages which will be apparent to those skilled in the art.

The term "cylinder-valve" used in my claims is intended to refer to a valve which constitutes the barrel of the cylinder in which the piston works.

I claim:—

1. The combination of a reciprocating fluid-controlling valve, and linkage swung back and forth by the valve into positions of greatest and least mechanical advantage over the valve coinciding with different positions of said valve.

2. The combination of a reciprocating fluid-controlling valve, and linkage swung back and forth by the valve and arranged to assume a position of maximum mechanical advantage over the valve occurring at one extreme of the valve's movement.

3. The combination of a reciprocating fluid-controlling valve, and linkage swung back and forth by the valve and capable of assuming a position of substantially infinite mechanical advantage thereover at one extreme of the valve's movement.

4. A valve in combination with means for intermittently actuating the same by a moving force of indeterminate time effect, and a valve-arresting lever device acting with increasing mechanical advantage over the valve as the valve approaches an extreme of its movement.

5. The combination with a relatively-reciprocating piston and cylinder, of a reciprocating valve controlling an opening of said cylinder and reaching its extreme positions independently of the dead-points of the piston, and linkage actuated by the valve and adapted to arrest the same with positive retardation.

6. The combination of a reciprocating valve, linkage swung by the valve for arresting the movement thereof with positive retardation, and a spring combined with said linkage, for modifying the action of said linkage on the valve.

7. The combination of a reciprocating valve, a spring, and linkage swung by the valve whose mechanical advantage over the valve and over the spring varies inversely.

8. In combination, a reciprocating valve, a toggle, and a spring whose maximum effect in resisting the straightening of the toggle coincides with the maximum effect of the toggle in arresting the valve.

9. In a motor, compressor or pump, the combination of a cylinder and piston, a reciprocating valve for opening and closing the interior of said cylinder, and a link swung by the valve and connected to arrest the latter substantially at dead-point of the link.

10. The combination of a reciprocating valve, and a toggle swung by the valve and connected to arrest the latter substantially at the limit of straightening movement of the toggle.

11. The combination of a reciprocating valve, a spring for arresting said valve, and valve-operated means for varying the mechanical advantage between said valve and spring.

12. The combination of a reciprocating valve, a link swung by the valve and connected to arrest the latter substantially at dead-point of the link, and a spring connected to resist the valve-arresting movement of said link.

13. The combination of a reciprocating valve, a toggle swung by the valve and connected to arrest the latter substantially at the limit of straightening movement of the toggle, and a spring connected to resist said straightening movement.

14. In a motor, compressor or pump, the combination of a cylinder, a piston therein, a non-seating piston-valve in the end of said cylinder movable by the fluid-pressure within the cylinder, and mechanism imposing a positive retardation for arresting the inward closing movement of said valve.

15. The combination of a reciprocating valve, and a toggle-and-spring mechanism yieldingly tending to hold said valve in a position intermediate between the two extremes of its movement.

16. In a motor, compressor or pump, the combination of a working cylinder, a working piston therein, a piston-valve at the end of said cylinder movable outwardly by the compression between it and the piston, said valve and piston having over-lapping positions, and a toggle arranged to arrest by its straightening movement the inward movement of said valve.

17. The combination of a working cylinder, a working piston therein, a piston valve movable by the compression produced by said piston to open said cylinder, and a toggle arranged to arrest by its straightening movement the inward movement of said valve.

18. In a motor, compressor or pump, the combination of a working piston, a piston-barrel constituting a valve, and a toggle arranged to arrest by its straightening movements the movements of said barrel in both directions.

19. In a motor, compressor or pump, the combination of a working piston, a piston-barrel constituting a valve, a toggle arranged to arrest by its straightening movements the movements of said barrel in both directions, and spring mechanism associated with said toggle and adapted to resist the straightening movements thereof.

20. In a motor, compressor or pump, the combination of a working cylinder the barrel whereof constitutes a valve, a head-chamber opening from the cylinder, and a piston-valve guided in said barrel and controlling communication between its interior and the head chamber.

21. In a motor, compressor or pump, the combination of a cylinder casing, a cylindrical member, an axially-sliding sleeve valve telescopically inclosing said cylindrical member and coöperating internally therewith and externally with the casing to control communication with the working cylinder space, and a working piston movable within the cylinder casing relatively to said valve and cylindrical member.

22. In a motor, the combination of a cylinder casing, a cylinder head, a longitudinally-reciprocating cylinder valve telescoped with said cylinder head and coöperating internally therewith and externally with the cylinder casing to control communication with the interior of the cylinder valve, and a working piston movable within the cylinder valve relatively to the latter and to the cylinder head.

23. In a motor, the combination of a cylinder head, a cylinder casing, an axially-movable sleeve valve, telescoped upon said cylinder head and within said cylinder casing and having ports covered and uncovered by said head and casing, and a working piston movable relatively to said valve.

24. In a motor, the combination of a cylinder casing, a cylinder head, an axially-sliding sleeve valve telescoped upon said head and within the casing and coöperating with the two to control fluid admission to and exhaust from the working cylinder space, and a working piston movable relatively to said valve and head.

25. In a motor, the combination of a cylinder casing, a working piston therein and a crank-shaft connected to said piston, a longitudinally-movable sleeve valve substantially coaxial with said piston, and a second longitudinally-sliding valve telescoped within said sleeve valve, the sleeve valve coöperating externally with said cylinder casing and internally with said second valve to control fluid admission to and exhaust from the working cylinder space.

26. In a motor, the combination of a cylinder casing, a cylindrical axially-reciprocating slide-valve, a cylinder-valve coöperating externally with said casing and internally with said slide-valve to control communication with the interior of the cylinder valve, and a working piston reciprocating in the cylinder valve.

27. In a motor, the combination of a cylinder casing, a pair of axially-sliding valves telescoping on each other and controlling the cylinder admission, one of them also coacting with said casing to control the cylinder exhaust, and a working piston substantially coaxial with said valves and movable relatively thereto.

28. In a motor, the combination of a cylinder casing, an axially-sliding cylinder valve coöperating with said casing to control the cylinder exhaust, a second axially-sliding valve telescoped within said cylinder valve and coöperating therewith to control the cylinder admission, a working piston reciprocating within said cylinder valve, and a crank-shaft connected with said working piston.

29. In a motor, the combination of a cylinder casing, an axially-reciprocating piston valve or head, an axially-reciprocating sleeve valve telescoping on said piston valve and coöperating internally therewith and externally with the cylinder casing to control communication with the working cylinder space, and a working piston movable with respect to said valves and substantially coaxial therewith.

30. In a motor, the combination of a cylinder casing having an end admission-chamber, a working piston, an axially-sliding sleeve valve alined with said piston and controlling the cylinder exhaust, and an axially-sliding piston valve telescoped within said sleeve valve between the working cylinder space and said end chamber and controlling communication between the two.

31. In a motor, the combination of a working cylinder and piston, a freely-movable non-seating piston valve controlling the cylinder admission, and linkage swung back and forth by the valve for positively and progressively limiting the movement of said valve.

32. In a motor, a working cylinder the barrel whereof constitutes a valve, a piston reciprocating in said cylinder, a fixed casing having a supply chamber, and a piston admission valve guided in said barrel and controlling communication between its interior and said supply chamber.

33. In a motor, a fixed casing having supply and exhaust chambers, a working cylinder the barrel whereof constitutes a valve controlling communication between its interior and said supply and exhaust chambers, a piston reciprocating in said barrel, and a piston valve guided in said barrel and controlling communication between the interior thereof and the supply chamber.

34. In a motor, the combination of a reciprocating piston, non-seating cylinder and disk valves constituting the barrel and head of said cylinder and having strokes shorter than the piston stroke, said valves coacting with each other to control the cylinder admission and the barrel valve acting to control the cylinder exhaust.

35. In a motor, the combination of a cylinder casing, a piston reciprocating therein, a longitudinally-reciprocating sleeve valve substantially coaxial with said piston and coöperating with said casing to control communication with the interior of the cylinder, and a second axially-reciprocating sleeve valve telescoped with the first valve and coöperating therewith to control communication with the interior of the cylinder, said valves having movements shorter than the piston movement.

36. The combination of a casing, a reciprocating piston, and two cylindrical valves surrounding the piston and operating one upon the other.

37. The combination of a casing, a reciprocating piston, and inner and outer valves concentric with the piston and sliding one upon the other, the inner valve having a port controlled by the outer valve.

38. A piston and cylinder apparatus comprising a reciprocating piston and a pair of coöperating axially-sliding cylindrical valves surrounding said piston.

39. The combination of an axially-movable cylinder-valve, a piston reciprocating therein, and a sleeve-valve movable on the outside of the cylinder-valve.

40. The combination of a casing, a reciprocating piston, two cylindrical valves surrounding the piston and operating one upon the other, and means for moving said valves.

41. The combination of a casing, a reciprocating piston, two cylindrical valves surrounding the piston and operating one upon the other, and means for reciprocating said valves axially.

42. The combination of a casing, a reciprocating piston, two cylindrical valves surrounding the piston and operating one upon the other, and means for moving said valves relatively and independently.

43. The combination of a reciprocating piston, and valve mechanism controlling fluid admission to and exhaust from the chamber in which said piston travels and including coöperating axially-movable valves surrounding said piston.

44. The combination of a movable cylinder controlling exhaust from its interior, a piston reciprocating therein, and an admission valve sleeve working on said cylinder.

45. The combination of an axially-movable cylinder having admission and exhaust ports, a piston moving therein, and an outer valve sleeve movable axially on the cylinder and controlling the admission port.

46. The combination of a reciprocating piston, an axially-movable valve surrounding the piston and having admission and exhaust ports in different zones of its length, and an axially-movable valve sleeve working on the first valve and controlling the admission port.

47. The combination of a fixed casing having an exhaust port, an axially-movable cylinder-valve having an exhaust port coöperating with the fixed exhaust port and also having an admission port, a piston reciprocating in said cylinder-valve, and an outer valve sleeve controlling said admission port.

48. The combination of a fixed casing having a cylinder guide and an exhaust port, a cylinder-valve in said guide having a coöperating exhaust port and an admission port, a piston reciprocating in said cylinder-valve, and an outer valve sleeve controlling said admission port.

49. In an apparatus of the character specified, the combination with the cylinder casing, of a reciprocating piston, and three cylindrical axially-reciprocating valves alined therewith and coöperating to control communication with the working cylinder space.

50. In a motor, the combination with the cylinder casing, of a reciprocating piston therein, and valve mechanism controlling communication with the working cylinder space and including a pair of valve sleeves working axially in each other in line with the piston, and an axially reciprocating piston valve or head telescoped within the inner sleeve.

51. The combination of an inner axially-movable cylinder-valve controlling fluid admission to and exhaust from its interior, a piston working in said cylinder-valve, a piston disk valve working in the end of said cylinder-valve and controlling the fluid admission, and a valve sleeve working on the outside of the cylinder-valve and controlling the admission cut-off.

52. The combination of an axially-movable cylinder-valve having admission and exhaust ports, a piston working therein, a freely-movable piston disk valve working in the end of said cylinder-valve and controlling the admission port, and an axially-movable cut-off valve sleeve surrounding said cylinder-valve and also controlling the admission port.

53. The combination of a cylinder casing, a working piston, a cylindrical cylinder-head, and a freely-movable cylinder-valve telescoping on said cylinder-head and moved by the friction of the piston, said cylinder-valve coöperating externally with said cylinder casing and internally with said cylinder head to control communication with the interior of the cylinder.

54. The combination of a cylinder casing, a working piston, a freely-movable cylinder valve surrounding said piston and moved by the friction thereof, and an axially-movable cylindrical slide-valve coöperating with said cylinder valve.

55. The combination of a cylinder casing, a reciprocating piston, a freely-movable cylinder valve surrounding said piston and reciprocated by the friction thereof, and an axially-movable piston-valve or head telescoping within said cylinder valve.

56. The combination of a cylinder casing, a piston reciprocating therein, a sleeve valve controlling communication with the interior of the cylinder, and a freely-movable piston valve telescoping within said sleeve valve and operated by differences of fluid pressure internal and external to the cylinder.

57. The combination of an axially-movable cylinder valve, a piston reciprocating therein, and a freely-movable piston admission-valve telescoping within said cylinder valve and operated by differences of fluid pressure internal and external to the cylinder.

58. The combination of a casing and piston, a cylinder-valve surrounding the piston and moved by the friction thereof, and a valve sleeve surrounding and movable on the cylinder-valve.

59. The combination of a casing and piston, a cylinder-valve surrounding the piston and moved by the friction thereof, a valve sleeve surrounding and movable axially on the cylinder-valve, and connections for positively operating said valve sleeve.

60. The combination of a casing and piston, a cylinder-valve surrounding the piston and moved by the friction thereof, a freely-movable piston disk-valve working in the end of said cylinder-valve, and a valve sleeve working on the outside of said cylinder-valve.

61. The combination of a casing and piston, a cylinder-valve surrounding the piston and moved by the friction thereof, said valve having admission and exhaust ports, a freely-movable piston disk-valve working in the end of said cylinder-valve and controlling its admission port, and a positively-operated cut-off valve-sleeve working axially on the outside of said cylinder-valve and also controlling said admission-port.

62. The combination of a casing and a reciprocating piston therein, a plurality of non-seating annular valves arranged between the piston and the casing, and means for independently moving said valves.

63. The combination of a casing and a reciprocating piston therein, a plurality of non-seating annular valves arranged between the piston and the casing and having coöperating ports, and means for reciprocating said valves, said means including an eccentric operated from the crank shaft.

64. The combination with a movable piston, an independently movable cylinder surrounding the piston, and a stationary casing surrounding the piston and cylinder, of a sleeve slidable on said cylinder, and means connecting the sleeve with the crank shaft for moving said sleeve.

In testimony whereof I have hereunto set my hand in the presence of two subscribing witnesses, this ninth day of February, 1909.

SIDNEY A. REEVE.

Witnesses:
R. M. PIERSON,
G. BLAKE.